US007640191B2

(12) United States Patent
Mueller et al.

(10) Patent No.: US 7,640,191 B2
(45) Date of Patent: Dec. 29, 2009

(54) CLUSTERED BIDDING AND AUCTIONS IN A PROCUREMENT SYSTEM

(75) Inventors: Ruediger Mueller, Wiesloch (DE); Alexander Zaichenko, Hockenheim (DE); Heiko Steffen, Ruelzheim (DE); Antonia Gross, Leimen (DE)

(73) Assignee: SAP Aktiengesellschaft, Walldorf (DE)

( * ) Notice: Subject to any disclaimer, the term of this patent is extended or adjusted under 35 U.S.C. 154(b) by 483 days.

(21) Appl. No.: 10/885,286

(22) Filed: Jul. 2, 2004

(65) Prior Publication Data

US 2005/0010521 A1 Jan. 13, 2005

Related U.S. Application Data

(63) Continuation-in-part of application No. 10/610,326, filed on Jun. 30, 2003.

(51) Int. Cl.
*G06Q 30/00* (2006.01)
(52) U.S. Cl. .......................................... 705/26; 705/37
(58) Field of Classification Search .................. 705/26, 705/37
See application file for complete search history.

(56) References Cited

U.S. PATENT DOCUMENTS

2004/0073507 A1 * 4/2004 Scott et al. .................... 705/37

OTHER PUBLICATIONS

Business-to-government e-commerce procurement: Business models, e-mails, and special groups, Laura Gordon-Murnane. Searcher. Medford: Jan. 2001. vol. 9, Iss. 1; p. 64, downloaded from ProQuest Direct on the Internet on Aug. 1, 2009, 11 pages.*

* cited by examiner

*Primary Examiner*—James Zurita
(74) *Attorney, Agent, or Firm*—Fish & Richardson P.C.

(57) ABSTRACT

A purchase hub system for an enterprise may enable a purchasing agent to cluster bids from different enterprise buyer systems in the enterprise. The purchase hub system may receive purchasing requests including multiple requirements from the different enterprise buyer systems and suggest potential groupings of the requirements based on, e.g., item categories assigned to the requirements. The purchasing agent may then create a bid opportunity, e.g., a bid invitation or auction, including the clustered bids.

12 Claims, 8 Drawing Sheets

CLUSTERED BIDDING AND AUCTIONS IN A PROCUREMENT SYSTEM

CROSS REFERENCE TO RELATED APPLICATIONS

This application is a continuation-in-part application of and claims priority to U.S. application Ser. No. 10/610,326, filed on Jun. 30, 2003 and entitled "Purchasing Hub for a Procurement System".

BACKGROUND

Companies may utilize computer-implemented procurement systems to receive and process purchase requests for items, such as goods or services. One example of a computer-implemented procurement system uses a central purchasing computer, where all or certain purchase requests are sent to be processed. The purchase requests may be created on the central purchasing computer or on remote company computer systems.

A purchasing application executing on the central purchasing computer receives the requests for items to be purchased from suppliers. A user operating the purchasing application can view incoming requests, search for appropriate suppliers to fill the requests, and create purchase orders for the items. The purchase orders can then be printed and mailed, or electronically submitted, to the suppliers, who may then ship the ordered items.

SUMMARY

A purchase hub system for an enterprise may enable a purchasing agent to cluster bids from different enterprise buyer systems in the enterprise. The purchase hub system may receive purchasing requests including multiple requirements from the different enterprise buyer systems and suggest potential groupings of the requirements based on, e.g., item categories assigned to the requirements. The purchasing agent may then create a bid opportunity, e.g., a bid invitation or auction, including the clustered bids.

DETAILED DESCRIPTION

Figure 1:
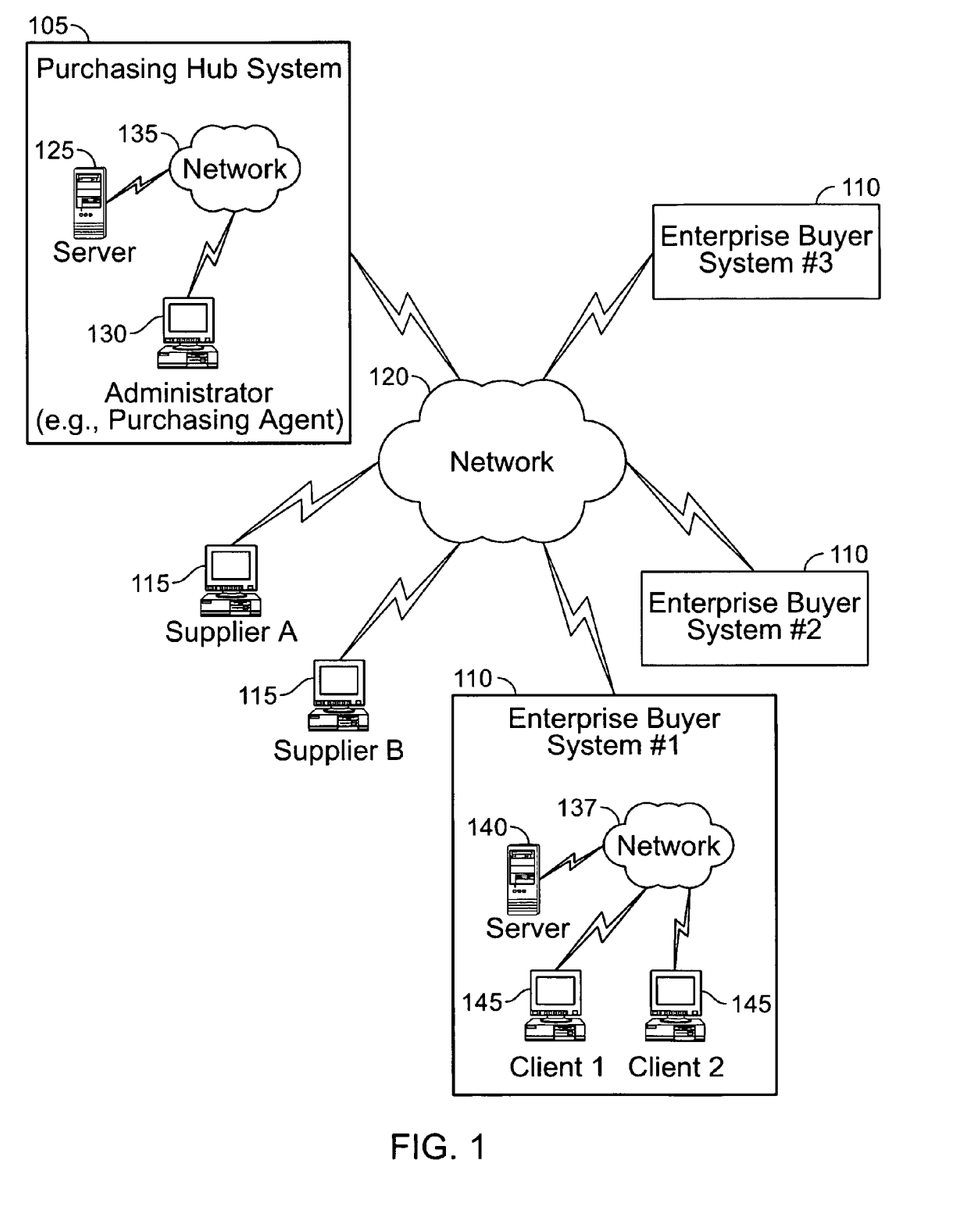
FIG. 1 is a block diagram of a purchasing hub system according to an embodiment.

FIG. 1 shows a purchasing hub system 105 which may serve as a control center for procurement operations in an enterprise. The purchasing hub system may enable an administrator, such as a purchasing agent for a company, to receive purchase requests from one or more enterprise buyer systems (EBSs) 110 in the company and source these requests to one or more suppliers. The purchasing hub system 100, EBSs 110, and supplier sites 115 may communicate over a network 120, such as the Internet.

The purchasing hub system 105 includes a purchasing hub server 125 and an administrator site 130. Administrator site 130 may include a computer system, such as a personal computer, terminal, handheld computing device, etc., from which a purchasing agent may control and execute procurement activities for the company. The purchasing agent may be a human operator interacting with software running on the computer system, an automated software process executing without human intervention, or various combinations of both. The purchasing hub server 125 and administrator site 130 may communicate over a network 135, such as a local area network (LAN), wide area network (WAN), intranet, or the Internet. The administrator site 130 may access the purchasing hub server 125 to run applications residing on the server 125.

Each EBS 110 may include a server 140 and client computer systems 145 which may communicate over a network 137. The EBSs 110 may individually procure items from suppliers that are known (that is, for which supplier information is available) locally to the individual EBS 110, or may utilize the purchasing hub system 105 to expand their procurement options. For example, a potential purchaser of goods and/or services may create a purchase request for an item at an EBS client computer system 145. The purchase request may be transmitted over network 137 and/or network 120 to the purchasing hub system 105, where it is received and processed.

The purchasing hub system 105 may then initiate a procurement process, wherein a suitable source of supply (such as a supplier represented by a supplier site 115, for example) is identified to fulfill the purchase request. A purchasing document, such as a purchase order or contract, may then be generated at the purchasing hub system 105 or a selected one of the EBSs 110. The selected supplier 115 can then be contacted, and a transaction can be completed.

EBS systems #1, #2 and #3 110 may be buying systems for various company units, divisions, or groups within the company, and need not necessarily be similar systems. For example, each may have previously been the respective buying system for independent companies that were acquired by the present company, and which continue to be used following the acquisitions. This may facilitate a smooth transition and minimize expenses during the acquisition by obviating the need for the acquired company to abandon their existing buying system for the system of the acquiring company.

Figure 2:
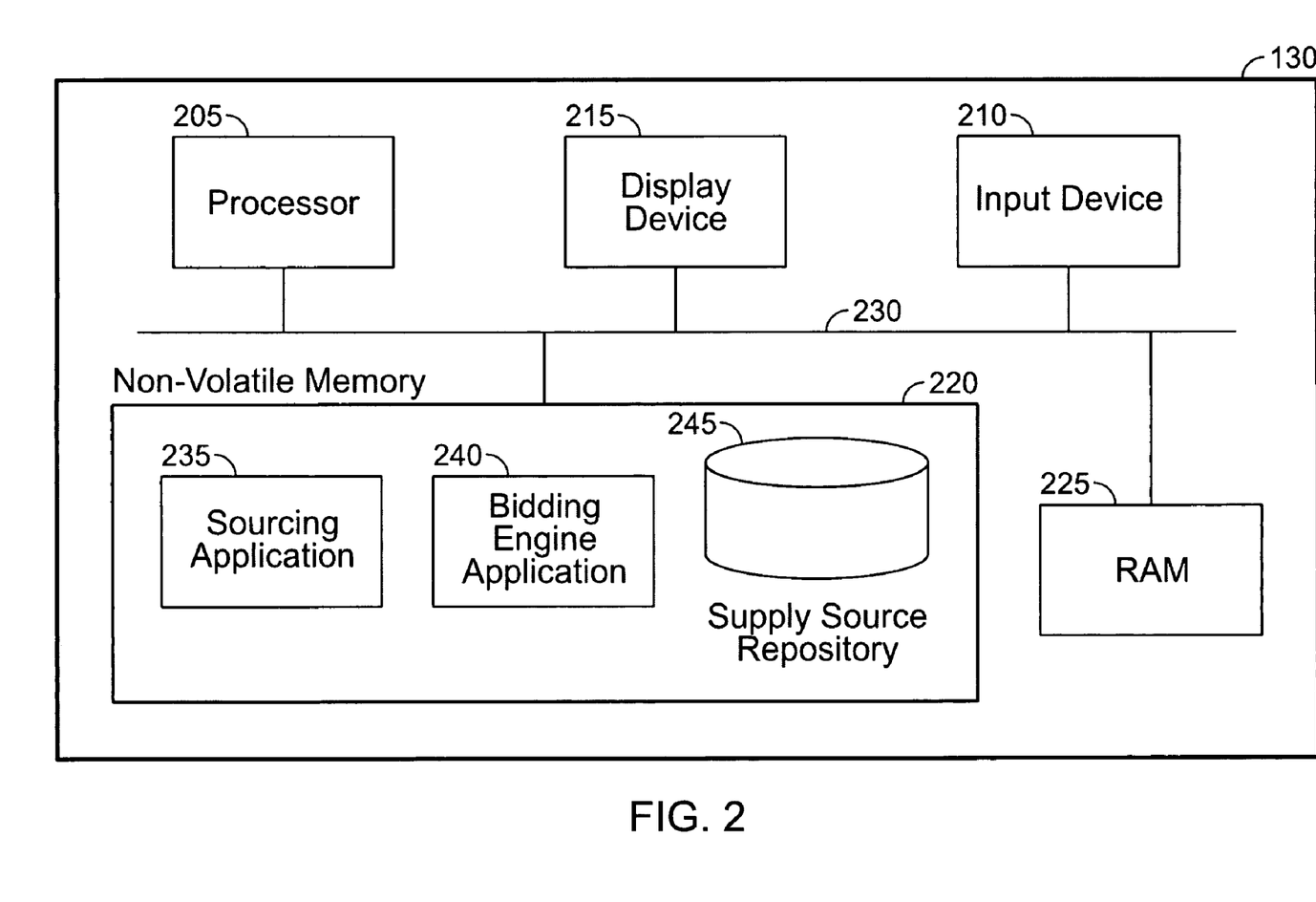
FIG. 2 is a block diagram of a central computer system including a sourcing application.

The administrator site 130 may be a client computer system such as that depicted in FIG. 2. The system can include a processor 205, one or more input devices 210, and a display device 215, whereon a user may be presented displays. Processor 205 executes computer application program instructions and controls the devices in the computer system. The programs may initially be stored in non-volatile memory 220, such as ROM, including magnetic disk memory, removable non-volatile storage media, and the like. As is conventional, application program instructions may be loaded to RAM 225, thereafter to be executed by processor 205 to perform particular application functions. A bus 230 facilitates communication between the processor 205 and the various devices attached to the bus 230.

The non-volatile memory 220 may include a sourcing application 235. The sourcing application 235 can manage a company's procurement operations, including creating purchase requests, receiving purchase requests from EBSs 110, grouping purchase requests and determining appropriate sources of supply, selecting appropriate systems in which to create purchase documents and creating the documents therein, and initiating auctions. Examples of such purchase documents include a purchase order for an item, or items, from a supplier, a contract detailing an agreement with a supplier to supply goods or services, and a bidding document to initiate a bidding invitation or an auction, whereby potential suppliers may bid to supply items.

Purchase orders may specify a one-time purchase of items, whereas contracts may specify longer-term procurement arrangements. The purchasing agent may use the sourcing application 235 to find the best source of supply for a given purchase request and to create the purchase document. By utilizing aspects of the sourcing application 235, the purchasing hub system 105 may provide a single access point for all procurement-relevant information throughout the company.

In an embodiment, the sourcing application 235 is made up of several different application program modules, some of which reside on a central computer system, such as administrator site 130, while others reside on a central server, such as purchasing hub server 125. Purchasing hub functions typically generate and require access to a large amount of data that is stored in various databases on a client or server. The data can include product and service information, supplier and vendor information, and rebate, discount, and preferred pricing information, to list just a few examples. In other implementations, the sourcing application 235 can reside entirely on the administrator site 130, or entirely on the purchasing hub server 125.

The non-volatile memory 220 may also include a bidding engine application 240 and a supply source repository 245. The bidding engine application 240 may work in concert with the sourcing application 235 to facilitate auctions (including reverse auctions) allowing potential suppliers to bid for the right to fulfill purchase requests by supplying a requested good or service at the bid price. In a reverse auction, potential suppliers. (such as suppliers represented by supplier sites 115) bid to supply items according to a bid-down principle where the price descends during the auction and the lowest bid is the winning bid. A reverse auction can provide purchasing agents with significant cost savings by better leveraging competition among suppliers.

The supply source repository 245 may contain a list of suppliers that the sourcing application 235 can identify to fulfill purchase requests, as well as a list of item category identifiers (discussed below). The supply source repository 245 can contain, for example, approved supplier lists, evaluations of supplier performance, historical procurement information (such as purchasing histories), lists of other company partners, and information on potential new suppliers. The sourcing application 235 may access the supply source repository 245 to search for a suitable supplier and select an appropriate system on which to create a purchase document. The supply source repository 245 may be "built-up" during an installation phase, and may subsequently be updated by the sourcing application 235, e.g., with information on new suppliers, changes to existing suppliers, or ratings on supplier performance. Following the creation of a purchase document, the sourcing application 235 may also update the repository 245 with transaction-relevant information.

Purchase requests may be represented as objects in the sourcing application 235. The purchase requests may share a similar format 300, such as that shown in FIG. 3. A purchase request may include a header 305 and a line item 310. The line item represents a "requirement" of a given group, and may be referred to as such. The header 305 may include general information about the purchase request, such as a purchase profile, classification, terms and conditions. The line item 310 describes a good or service to be purchased, and can include an item category identifier 325, a procurement criterion 330, one or more dynamic attributes 335 and one or more attachments 340.

Figure 3:
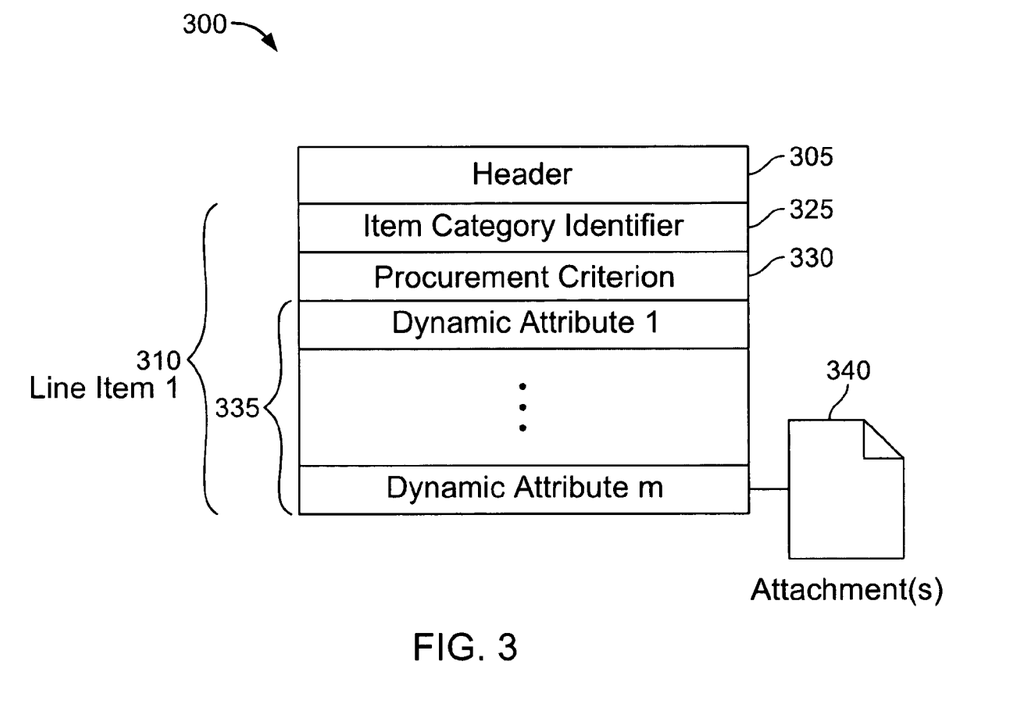
FIG. 3 is illustrates a purchase request format according to an embodiment.

The sourcing application 235 can use the item category identifier 325, which would typically be defined when the purchase request is created, to determine the system 105 or 110 in which to create a purchase document by referencing the item category list from the supply source repository 235. The item category identifier 325 may contain an entry representing a generic category description such as "computer", "office desk", or "printer" (or analogous numeric entries) corresponding to the desired item to be purchased.

The procurement criterion 330 is a directive to the sourcing application 235. Examples of procurement criterion entries may include, e.g., "Always Source Requirement", "Never Source Requirement", and "Create a Bidding Document if No Source of Supply is Available in the System". An "Always Source Requirement" entry indicates that the sourcing application 235 should conduct a search for an acceptable source of supply, such as by searching supply source repository 235 or repositories located at EBSs 110. A "Never Source Requirement" entry indicates that the purchase request contains a suggested source of supply, so that a search is unnecessary. In this case, the sourcing application 235 may directly create a purchase order at an appropriate system 105 or 110.

A "Create a Bidding Document if No Source of Supply is Available in the System" procurement criterion entry indicates that the sourcing application 235 should automatically (that is, without user intervention) create a bidding document for initiating an auction if no suitable sources of supply are available in the system. This may be appropriate, for example, when the desired item has never previously been procured by the company, following a new supplier's entrance into the market, or in situations where a bidding competition among suppliers is likely to result in a more favorable purchase price. In some implementations, the item category identifier 325, in combination with the procurement criterion 330, can be used to determine an appropriate source of supply to fulfill the purchase request and an appropriate system in which to create a purchase document.

Line items can further include, e.g., a product number, a description of the desired good or service, a desired quantity, a price field, and the system from which the request originated. Dynamic attributes 335 are essentially additional fields that can be used to customize a line item in the purchase request for the requestor's particular needs or industry, and can be added to provide additional information. Attachments 340 can be of any file type and can be added to the line item.

Requirements can arise in different areas of a company. For example, an employee A in department A may request a new personal computer, an employee B in department B may request a printer, and an employee C in department C may request a laptop computer. Typically a bid invitation or auction is created for each requirement. However in an embodiment, the sourcing application 235 may enable the purchasing agent to cluster similar requirements together into a group for presentation to potential suppliers for bidding (e.g. as a bid invitation or auction). Grouping requirements in this manner may be more efficient than presenting individual requests because, in many cases, a potential supplier (bidder) can deliver all, or more than one, of the products. Furthermore, as the overall value to the supplier is generally greater for orders including clustered requirements, the company may be placed in a better position for negotiating price.

The sourcing application 235 may provide the purchasing agent with various types of sourcing relevant information. The company can define rules (for example, depending on the product category and/or if a source of supply already exists) to determine which requirements are visible to the purchasing agent in the sourcing application. The sourcing application may automatically cluster requirements. For example, one possible basis on which to cluster requirements is, for example, the item category identifier 325 and/or line item description in the purchase requested received from a particular EBS. The company may generate a product hierarchy with different categories associated with the item category identifiers and/or line item description. Alternatively, another field may be added to the purchase request format 300. Product categories (i.e., personal computer equipment, stationary, furniture, etc.) may be assigned codes, which may be enticed by the individual who creates the purchase request.

In an exemplary clustering operation, the purchasing agent may receive the three requirements (e.g., PC, printer, and laptop) from one or more of the EBSs 110 and create just one bid invitation for all three. Using the Bidding Engine 240, the purchasing agent then completes the bid invitation, invites the bidder(s), and publishes the bid invitation (or alternatively creates and conducts an auction). Once the bidders have submitted their bids, the purchasing agent can compare these and determine a winning bid. Once the bid is approved, a purchase order or contract can be created and sent to the supplier.

Figure 4:
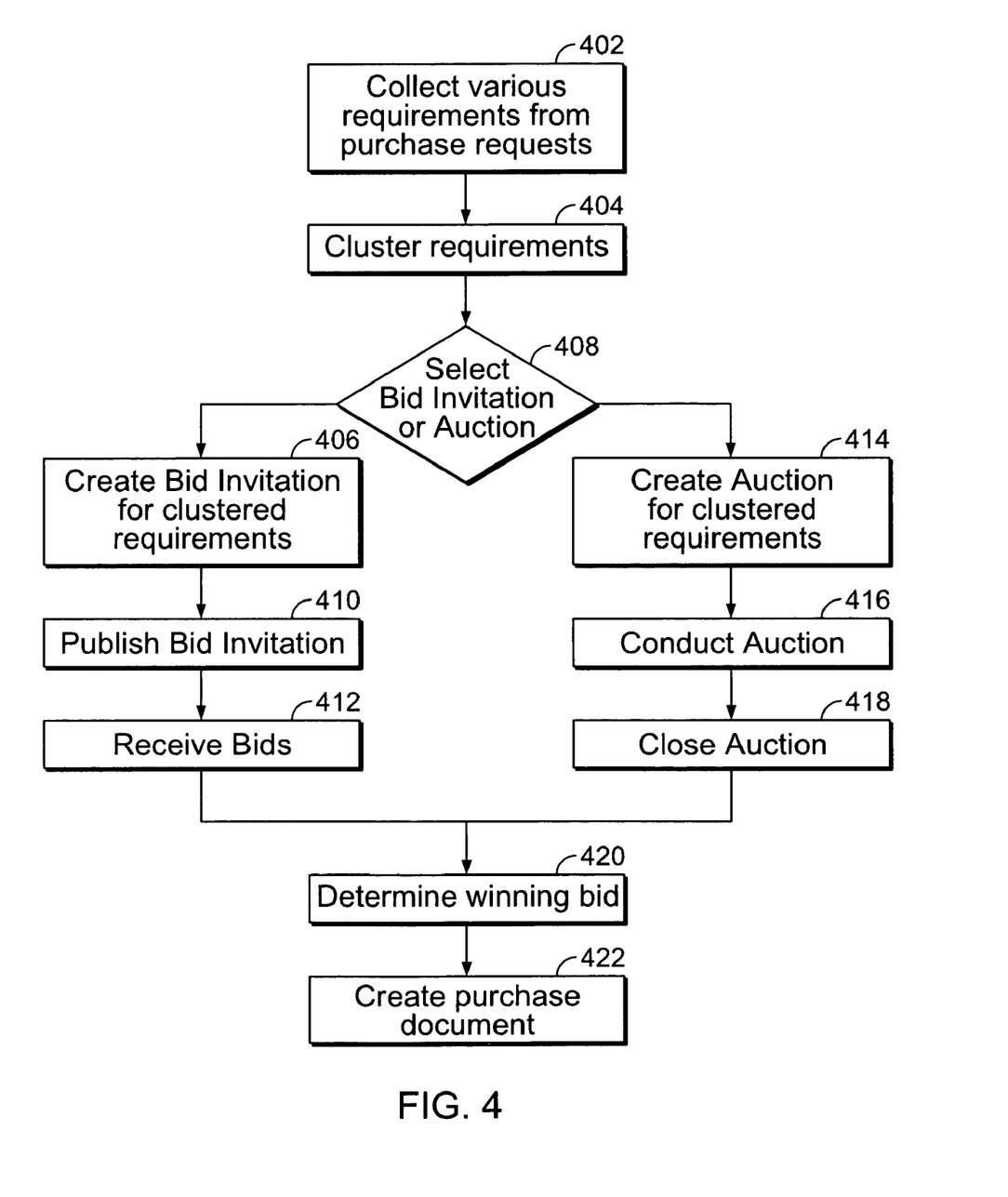
FIG. 4 is flowchart describing a clustered bidding operation.
Figure 5:
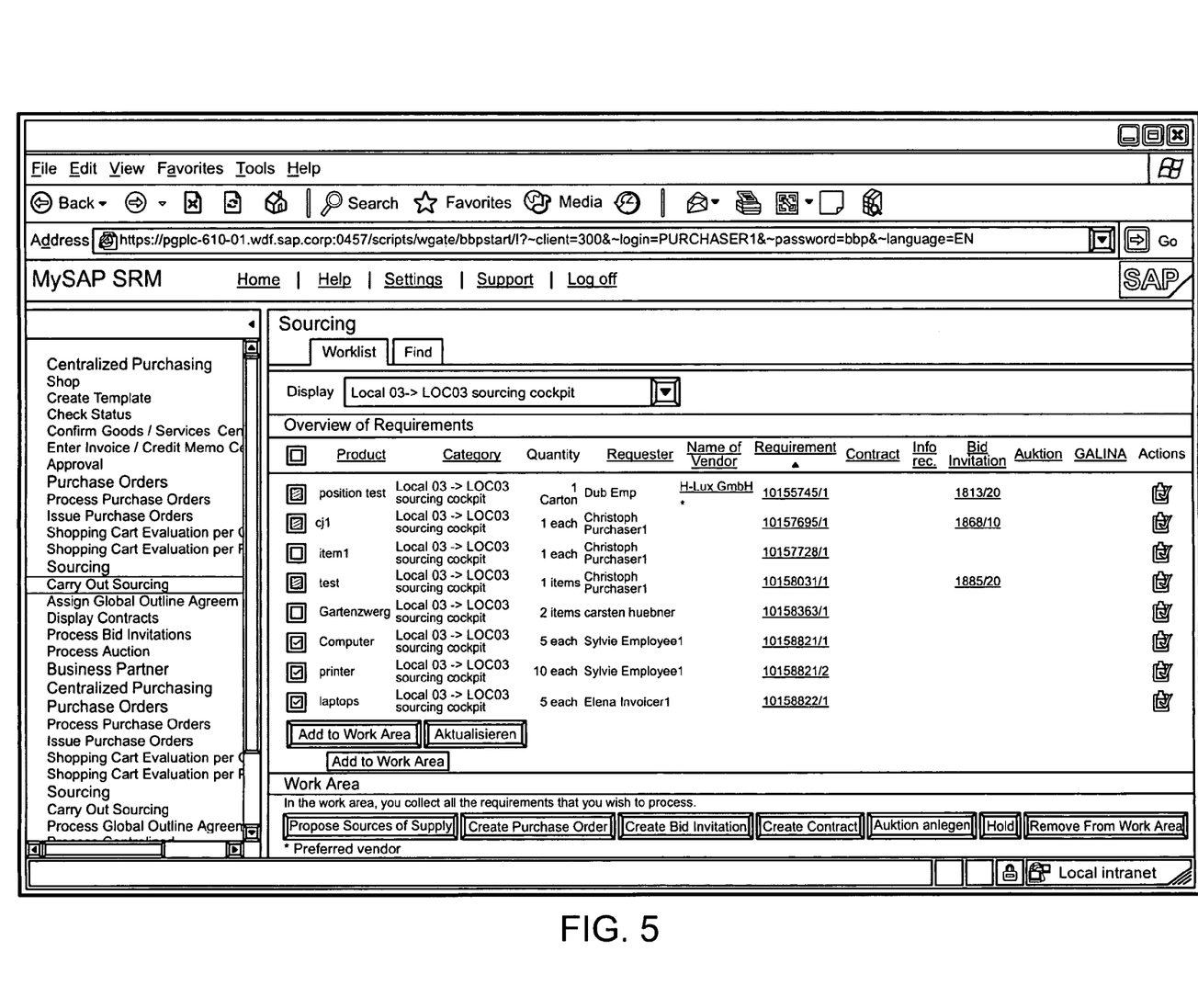
FIG. 5 is a display for presenting requirements from one or more enterprise buyer systems (EBSs) to a purchasing agent.
Figure 6:
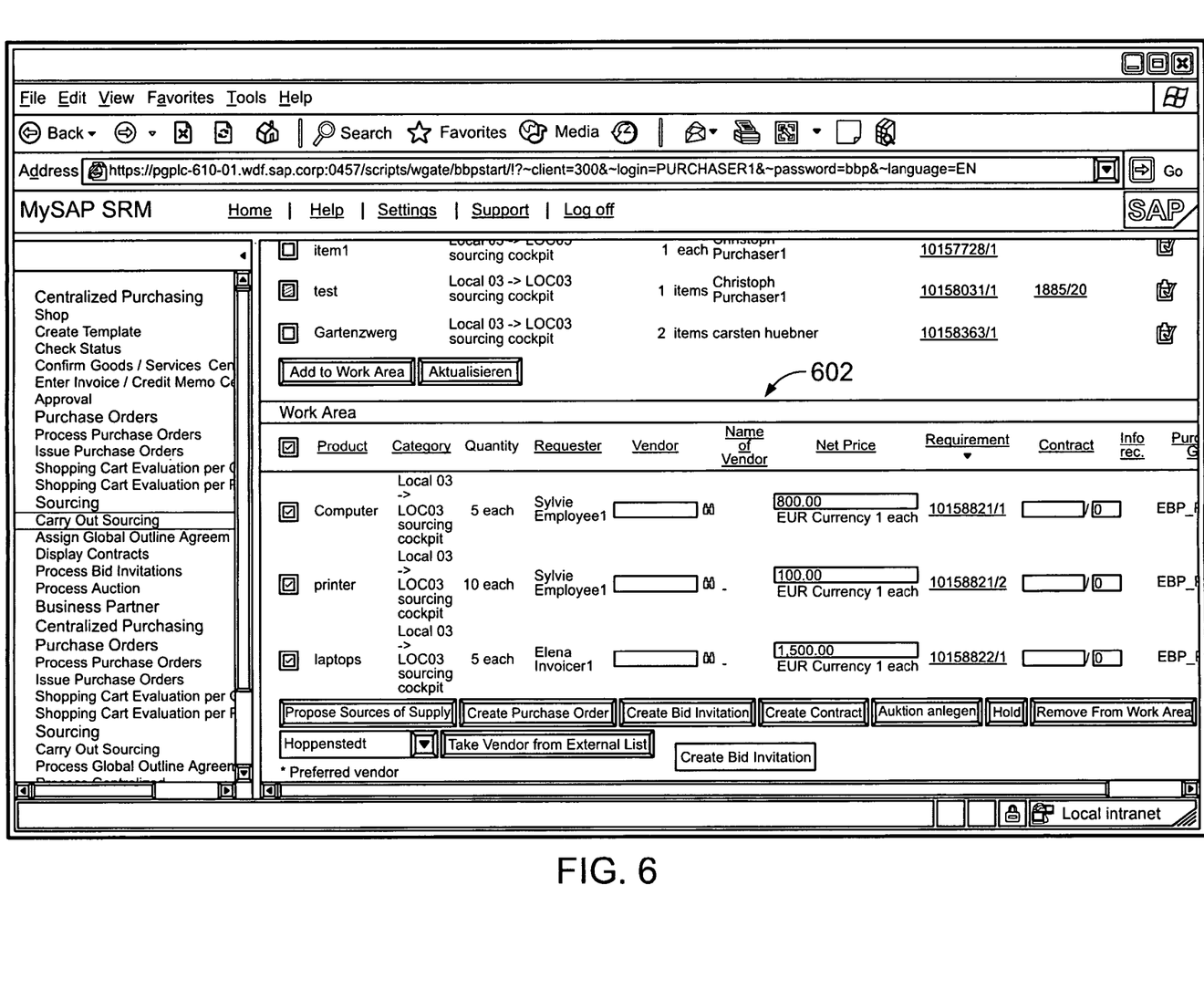
FIG. 6 is a display including a work area in which the purchasing agent may cluster requirements.

FIG. 4 is a flowchart describing a clustered bidding operation according to an embodiment. The sourcing application provides the purchasing agent with sourcing relevant information in a display. There, requirements from one or more of the EBSs 110 may be collected from a number of purchase requests and be presented to the purchasing agent (block 402), as shown in FIG. 5. Certain items may be grouped together in a work package, e.g., based on item categories. The items in the work package may be displayed in a work area 602, as shown in FIG. 6. The purchasing agent may group requirements together, using his or her judgment and/or based on certain rules (block 404). For example, the purchasing agent may group items together as suggested by the sourcing application as described above. However, the purchasing agent may also use discretion in clustering requirements.

Figure 7:
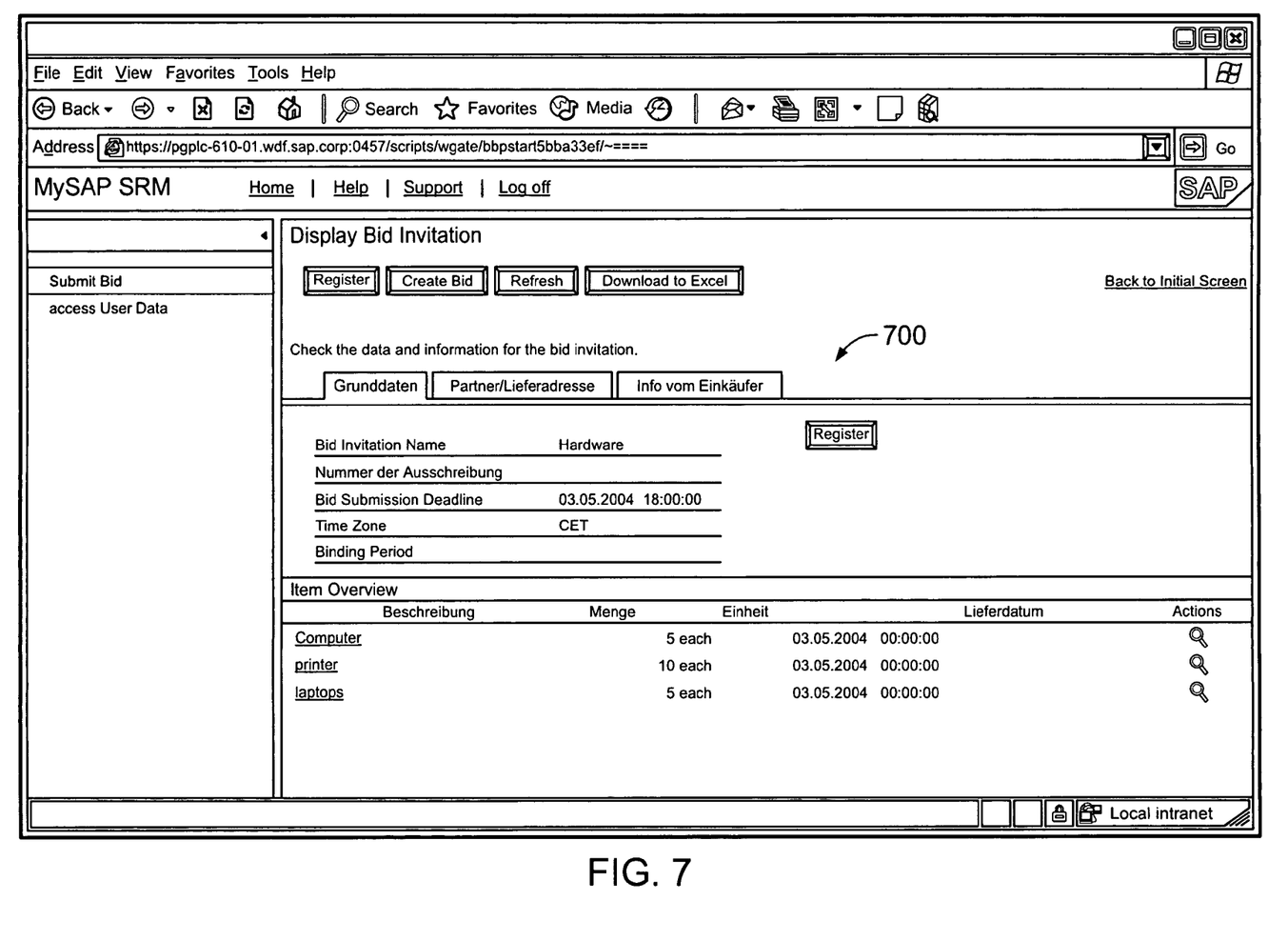
FIG. 7 is a display including a bid invitation with clustering requirements.

When the purchasing agent has finished clustering requirements for one bid invitation, the sourcing application may generate a bid invitation 700 (block 406), as shown in FIG. 7. The sourcing application may also provide the purchasing agent with the option of creating an auction with the clustered requirements (block 408).

Figure 8:
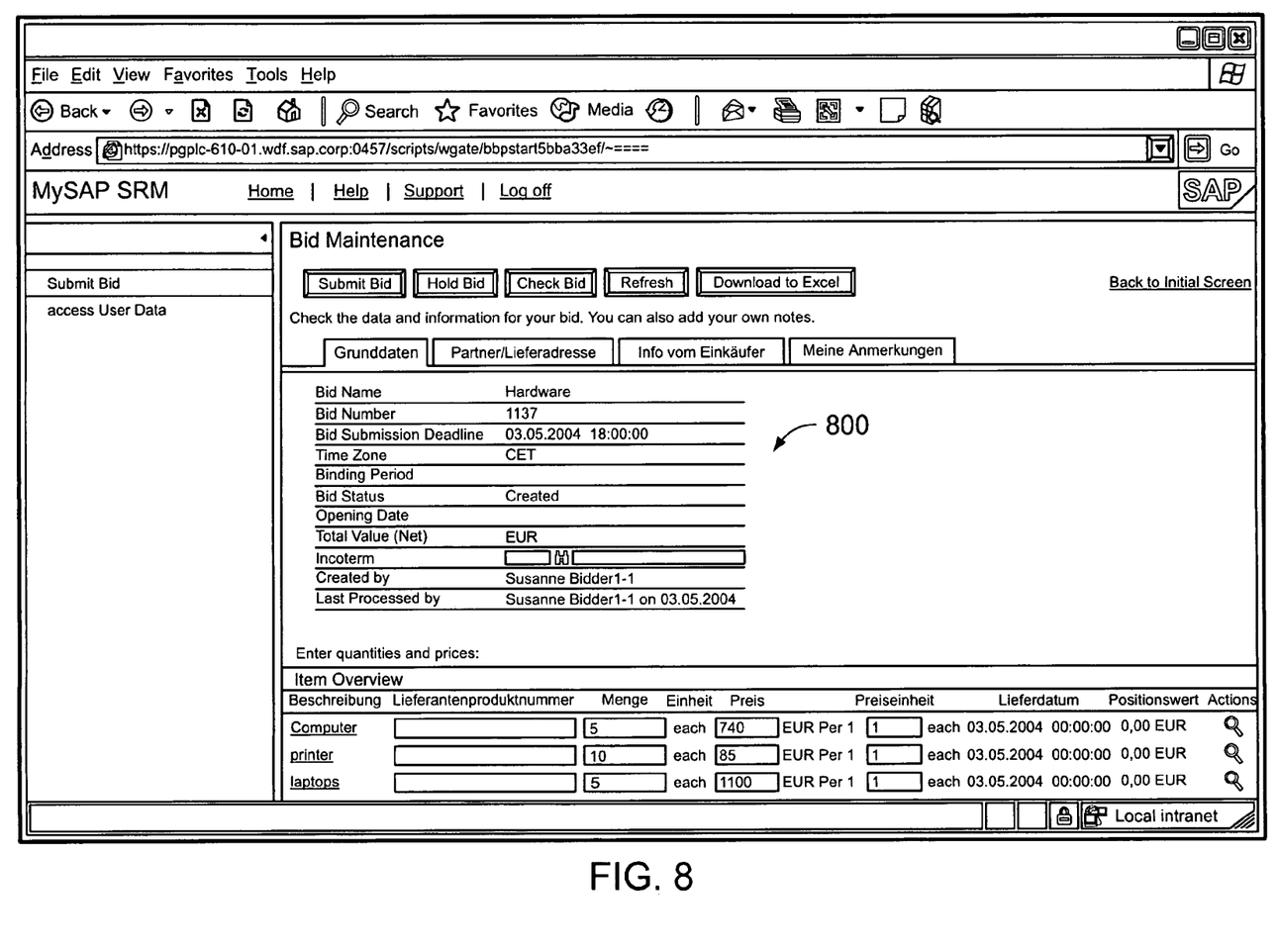
FIG. 8 is a display showing an exemplary published bid.

The bid may then be published (block 410), giving bidders the opportunity to place bids for the clustered requirements as a group. The bidder(s) may then enter a bid 800 (block 412), as shown in FIG. 8. Alternately, an auction may be created (block 414) held between bidders (block 416). When all bids have been received (block 412) or the auction closes (block 418), the winning bid may be determined (block 420). A purchase order or contract may then been created based on the winning bid (block 422). The sourcing application 235 can create a purchase document, such as a purchase order or a contract, in client computer systems at the purchasing hub system 105 or at any of the EBSs 110. Once the purchased documents are in place, the requirements may be fulfilled by the winning bidder.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. For example, the logic flows depicted in FIG. 5 does not require the particular order shown, or sequential order, to achieve desirable results. Accordingly, other embodiments are within the scope of the following claims.

The invention claimed is:

1. A computer-implemented method of determining a vendor to supply to an enterprise clustered supply requirements of the enterprise, the method comprising:

receiving, by a central purchasing hub computing system, a definition, for an enterprise, of a hierarchy comprising multiple different item categories of items of product or service that are purchased by the enterprise from vendors, and assigning to each of the different item categories a different item category identifier, wherein multiple different items of product or service are assignable to the same one of the multiple different item categories;

receiving, by the central purchasing hub computing system for the enterprise and from one or more enterprise buyer computing systems within the enterprise, a plurality of electronic purchasing requests, each electronic purchasing request including at least one supply requirement, each such supply requirement identifying an item of product or service that is requested to be supplied by a vendor to the enterprise, and further identifying a particular one item category identifier of a category defined in the hierarchy into which the item identified for the requirement has been assigned;

by the central purchasing hub computing system, identifying, from the received plurality of electronic purchasing requests, a plurality of the supply requirements that each identify the same particular one item category identifier for the item of product or service identified in the supply requirement, and clustering the identified plurality of the supply requirements having the same particular one item category identifier into a bidding cluster; and conducting, by the central purchasing hub computing system, an electronic bidding process using a bid invitation that includes the bidding cluster, making the bid invitation available over a network to at least one vendor, and determining from at least one bid received from the at least one vendor a winning bid that determines a particular vendor to fulfill all of the supply requirements of the bidding cluster.

2. The computer-implemented method of claim 1, wherein the bid invitation comprises an auction.

3. The computer-implemented method of claim 1, further comprising:

generating a purchase document based on the winning bid.

4. The computer-implemented method of claim 1, further comprising:

generating a work package including the identified plurality of the electronic supply requirements.

5. The computer-implemented method of claim 4, wherein the clustering comprises clustering the identified plurality of the electronic supply requirements in the work package.

6. The computer-implemented method of claim 1, wherein the receiving of the plurality of the electronic purchasing requests comprises receiving the plurality of electronic purchasing requests from a plurality of different enterprise buyer computing systems.

7. An article comprising a machine-readable storage medium including machine-executable instructions that when executed by a machine cause operations to be performed at a central purchasing hub computing system for an enterprise, the operations for determining a vendor to supply to an enterprise clustered supply requirements of the enterprise and comprising:

receive, from one or more enterprise buyer computing systems within the enterprise, a plurality of electronic purchasing requests, each electronic purchasing request including at least one supply requirement, each such supply requirement identifying an item of product or service that is requested to be supplied by a vendor to the enterprise, and further identifying a particular one item category identifier of a category defined in a hierarchy into which the item identified for the supply requirement has been assigned, the defined hierarchy being a hierarchy for the enterprise that comprises multiple different item categories of items of product or service that are purchased by the enterprise from vendors, wherein each of the multiple different item categories has a different assigned product category identifier, and wherein multiple different items of product or service are assignable to the same one of the multiple different item categories;

identify, from the received plurality of electronic purchasing requests, a plurality of the supply requirements that each identify the same particular one item category identifier for the item of product or service identified in the supply requirement and cluster the identified plurality of the supply requirements having the same particular one item category identifier into a bidding cluster; and conduct an electronic bidding process using a bid invitation that includes the bidding cluster, making the bid invitation available over a network to at least one vendor, and determining from at least one bid received from the at least one vendor a winning bid that determines a particular vendor to fulfill all of the supply requirements of the bidding cluster.

8. The article of claim 7, wherein the bid invitation comprises an auction.

9. The article of claim 7, further comprising instructions operative to cause the machine to:

generate a purchase document based on the winning bid.

10. The article of claim 7, further comprising instructions operative to cause the machine to:

generate a work package including said identified plurality of said requirements.

11. The article of claim 10, wherein the instructions for said clustering comprise instructions operative to cause the machine to cluster said identified plurality of said requirements in the work package.

12. The article of claim 7, wherein the instructions for said receiving comprise instructions operative to cause the machine to receive said plurality of purchasing requests from a plurality of enterprise buyer systems.

* * * * *

UNITED STATES PATENT AND TRADEMARK OFFICE
CERTIFICATE OF CORRECTION

PATENT NO.       : 7,640,191 B2                                    Page 1 of 1
APPLICATION NO. : 10/885286
DATED            : December 29, 2009
INVENTOR(S)      : Mueller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this

Ninth Day of November, 2010

David J. Kappos
*Director of the United States Patent and Trademark Office*